United States Patent [19]
Scarnato

[11] 3,939,887
[45] Feb. 24, 1976

[54] HERMETICALLY SEALABLE COLLAPSIBLE CONTAINER

[76] Inventor: Thomas J. Scarnato, 381 Valley Road, Barrington, Ill. 60010

[22] Filed: Sept. 19, 1974

[21] Appl. No.: 507,587

Related U.S. Application Data

[63] Continuation-in-part of Ser. No. 162,551, July 14, 1971, abandoned, and a continuation-in-part of Ser. No. 324,756, Jan. 18, 1973, abandoned.

[52] U.S. Cl. ................................ 150/.5; 150/.5 X
[51] Int. Cl.² .......................................... B65D 1/02
[58] Field of Search ........ 215/1 C; 150/.5; 222/107, 222/215

[56] References Cited
UNITED STATES PATENTS

| | | | |
|---|---|---|---|
| 2,685,316 | 8/1954 | Krasno | 150/.5 |
| 2,899,110 | 8/1959 | Parker | 150/.5 X |
| 3,027,044 | 3/1962 | Winstead | 220/63 R |
| 3,083,877 | 4/1963 | Gash | 222/107 |
| 3,143,429 | 8/1964 | Swanson | 215/1 C UX |
| 3,199,701 | 8/1965 | Santelli | 215/1 C |
| 3,434,589 | 3/1969 | Valtri | 150/.5 X |
| 3,547,294 | 12/1970 | Williams | 215/1 C |
| 3,586,084 | 6/1971 | Redmond | 150/.5 |

*Primary Examiner*—Donald F. Norton
*Attorney, Agent, or Firm*—Heise & Coolahan

[57] ABSTRACT

A self-expandable, foldable and reusable container made of elastic material which is adapted to be collapsed progressively from top to bottom to a volumetric dimension substantially equal to the substance contained therein to minimize air space in the container. An air tight closure is tightened about an access opening in said container while the same is held in collapsed condition. The folds of said container are formed with sections of different geometry to effect progressive flexibility from the top to the bottom thereof.

17 Claims, 11 Drawing Figures

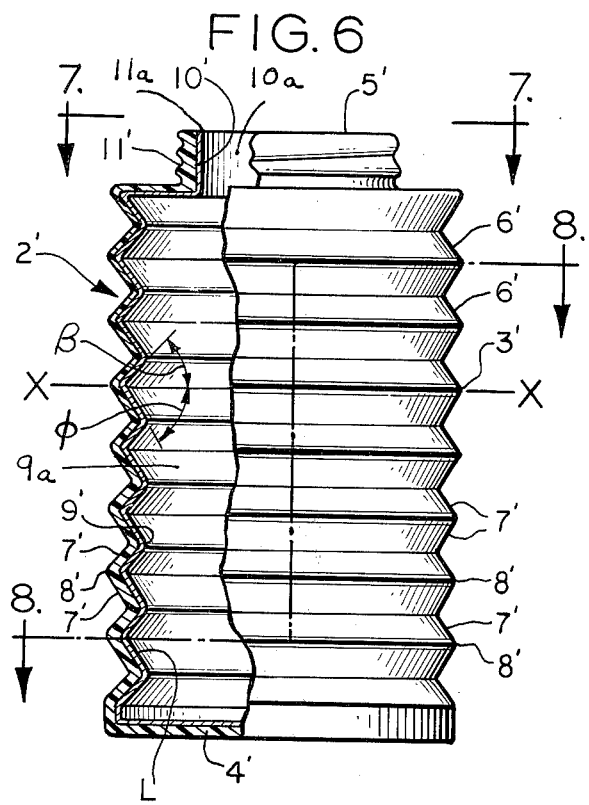
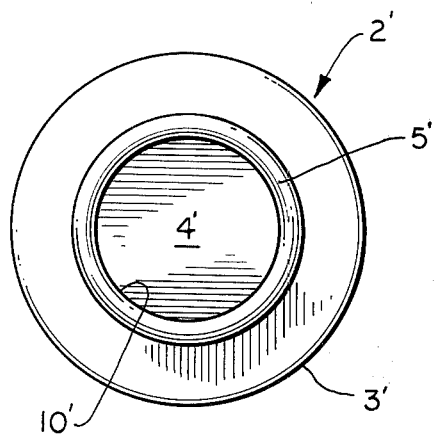
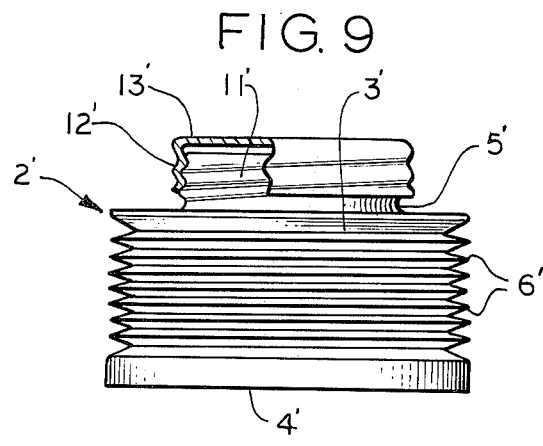
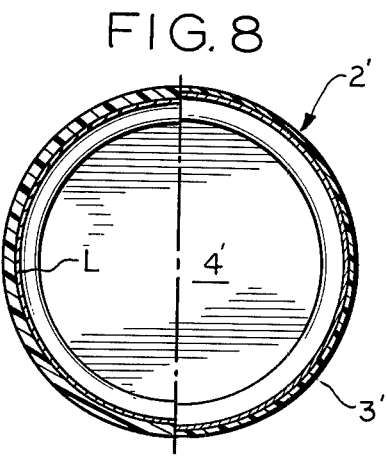
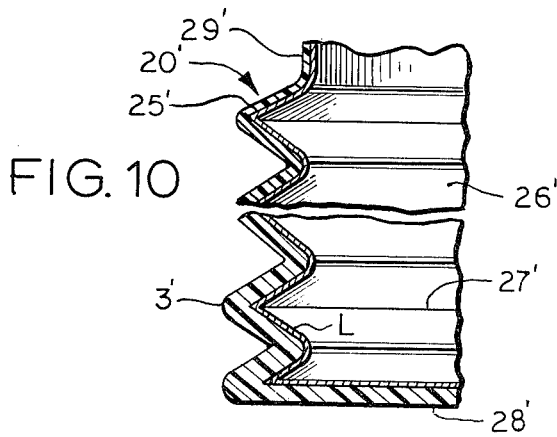
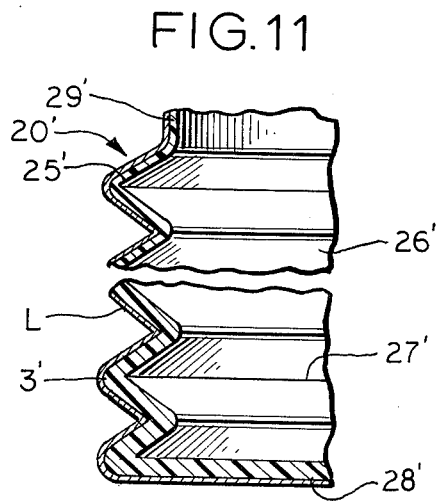

HERMETICALLY SEALABLE COLLAPSIBLE CONTAINER

This application is a continuation-in-part of my application Ser. No. 162,551 filed July 14, 1971 and a continuation-in-part application Ser. No. 324,756 filed Jan. 18, 1973, both now abandoned.

DISCUSSION OF THE ART

As far as is known to the inventor, there was heretofore never been known a container which is self-expanding and which is collapsible to the volume of material remaining in the container, and which self-indicates and imperfect seal. Rigid containers are available which have plastic caps adapted to snap over their access openings. Their deficiency is twofold, one that they are not good seals and secondly, as the volume of the perishable food dimishes through use, the volume of trapped air between the cap and the surface of the remaining food increases. If the container is large and the opening and closing are frequent, a change of air occurs at every opening and thus food spoilage is accelerated.

A general object of the present invention is to provide a novel collapsible container in which the folds are constructed to progressively collapse from top to bottom.

A specific object of the invention is to provide a container made of an inert plastic substance such as polyethylene and like class of materials and to so construct the body of the container that it can be readily collapsed and sealed.

A further object of the invention is to provide a container having an accordion type body so that it may be compressed, and which is self-expanding so as to create a vacuum in the container.

A still further object of the foregoing is to provide a container having folds which are constructed such that they are progressively thicker from the top to the bottom of the container.

A still further object of the invention is to provide a container which is constructed to prohibit gas permeability through the materials from which the container is made wherein a partial vacuum may be maintained upon the container being sealed at a partially expanded position.

A still further object of the invention is to provide a container with inicia which would readily inform the user of the loss of vacuum. These and other objects and advantages inherently in and encompassed by the invention will become more readily apparent from the specifications and the drawings wherein:

FIG. 6 is a side elevational view of another embodiment of the invention shown partly in vertical section;

FIG. 7 is a top view taken substantially on the line 7—7 of FIG. 6;

FIG. 8 is cross sectional view taken substantially on line 8—8 of FIG. 6;

FIG. 9 is a side elevational view of the structure of FIG. 6 in a collapsed position;

FIG. 10 is a fragmentary axial section view of the embodiment shown in FIG. 6; and FIG. 11 is a fragmentary axial section view of a modification of the container shown in FIG. 6.

DESCRIPTION OF FIGS. 1-4

Describing the invention in detail, there is shown a container generally designated 2 formed preferably of polyethylene or nylon or like plastic material which is inert to foods and possesses the characteristics of resiliency and memory to expand to its original condition.

The container comprises a preferably cylindrical body portion 3, a base 4 at the top of the body portion and a threaded neck 5 at the upper end of the body portion.

Figure 1:
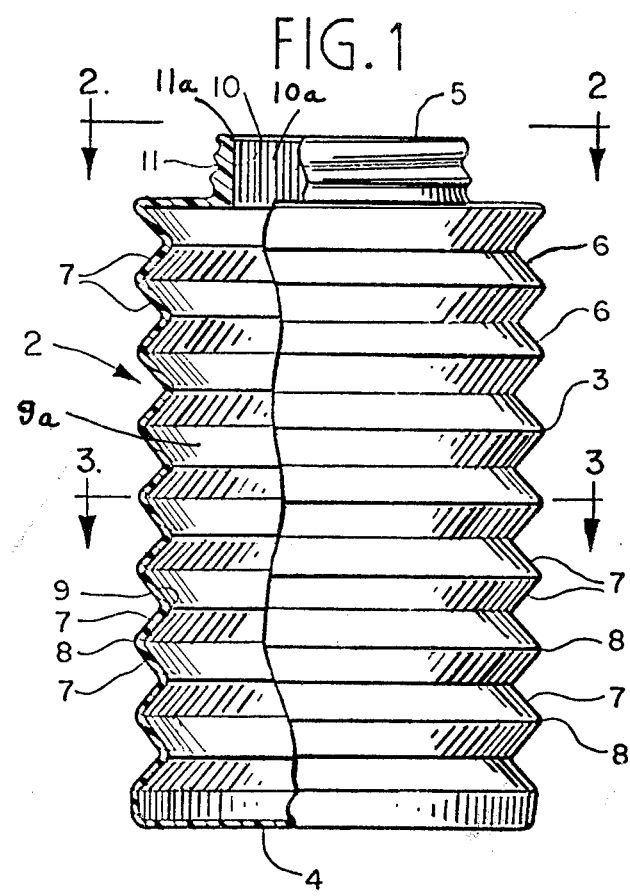
FIG. 1 is a side elevational view of one embodiment of the invention showed partly in vertical section.
Figure 2:
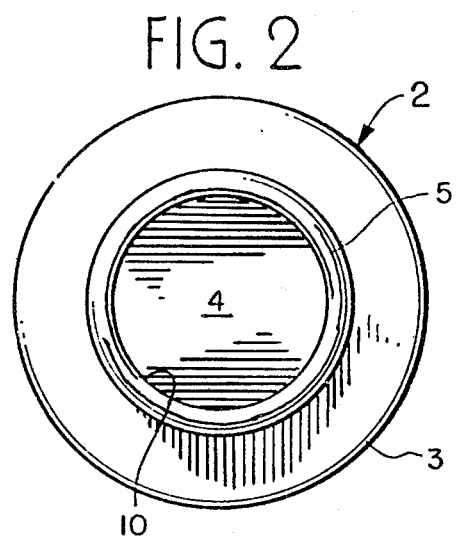
FIG. 2 is a top view taken substantially on the line 2—2 of FIG. 1.
Figure 3:
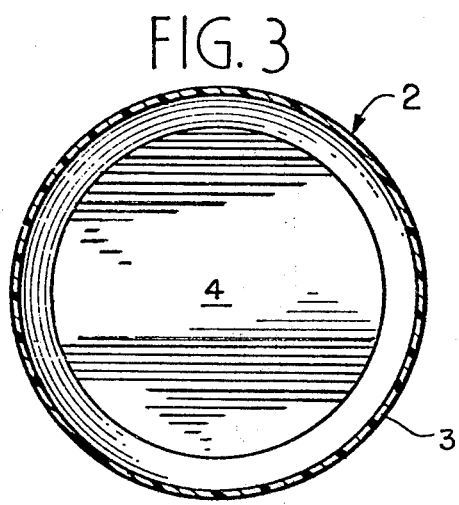
FIG. 3 is a cross-sectional view taken substantially on line 3—3 of FIG. 1.
Figure 4:
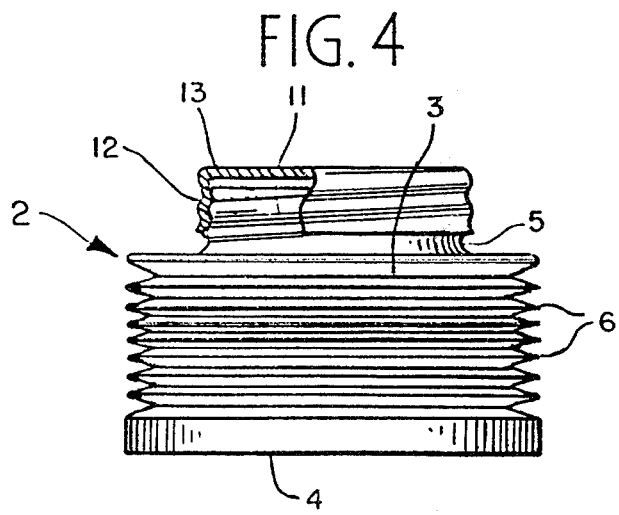
FIG. 4 is a side elevational view of the container in collapsed condition.

The body portion 3 is formed with pleats of corrugations 6, 6 which are defined by frusto conical annular segments 7, 7 which join in apical external and internal ridges 8, and 9 which rigidify the structure transaxially as well as circumferentially. Thus, a volume of substance such as liquid as well as solid particulate material is readily contained without radial distension of the container. The pleating or accordion shape of the body is so constructed that it tends to assume an expanded free state as seen in FIG. 1. In order to collapse the container it must be forcibly pressed down to the level of the particulate or fluid within the container. Thus the volumetric dimension of the container approximates the volume of the material within the container. As the material is depleted through the ingress-egress opening 10 of the neck portion the container is progressively collapsed. Inasmuch as the material composing the container is biased to expand, it will tend to do so which prevents the contents from spilling out of the container, if the container tended to collapse.

In the embodiments of the invention chosen for illustration, the neck 5 is threaded at 11 and receives a closure cap 12 threaded thereon. The cap 12 has a top portion 13 with a sealing ring 14 of any suitable elastomeric material for engaging the rim 15 of the neck as the cap is screwed on.

In actual tests the container would, after the cap has been applied, slightly expand from its extended collapsed position and thus create a partial vacuum above the contents therein. If the cap were not turned down tightly enough or if the seal was defective, the container would expand. The rapidity with which this would occur depends upon the extent of the defect in the seal. Thus it became readily apparent to the user that the contents were not adequately protected from possible deterioration. It will be noted that the thickness of the wall section composed of the segments 7, 7 of the body portion is essentially uniform in this embodiment.

EMBODIMENT OF FIG. 5

The structure of the container of this embodiment designated 20 is essentially the same as in the container described in FIGS. 1-4, except that the corrugation 25 of the side wall 26 of the body 3a of the container are spiraled or formed in a helix 27 in the nature of a compression spring and the thickness of the wall section progressively becomes thinner from the base 28 to the neck 29. In other words the segments which form the corrugations 25 of the side wall 26 at any particular point will be constructed such that the upper segment is thinner than the lower segment at that particular point. Thus a more rigid structure is at the bottom than at the top so that as the contents of the container are depleted, the upper portion of the container is more easily collapsed without sacrificing transverse strength since in the container the loads progressively increase toward the base.

Of course, it is within the scope of this invention to form the body walls of any shape and to vary the dimensions of various portions of the walls to achieve the desired flexibility and strength. In other words, the helix may be of thicker section at the crest and progressively become thinner toward the nadir of the corrugation.

EMBODIMENT OF FIGS. 6–10

This embodiment has all of the characteristics of the materials and purposes of the previously described embodiments but distinguishes in several principal features as will be hereinafter described.

It will be understood that the parts described in embodiment 1 through 4 will carry the same reference numerals except that in the present embodiment they will be designated with a prime.

It can be seen that the container comprises a preferably cylinder portion 3', a base 4' at the bottom of the body portion and a threaded neck 5' at the upper end of the body portion.

The body portion 3' is formed with pleats of corrugations 6', 6' which defined by frusto conical annular segments 7', 7' which join in apical external and internal ridges 8', and 9' and which rigidify the structure transaxially as well as circumferentially. Thus, a volume of substance placed in this embodiment such as a liquid as well as solid particulate material is readily contained without radial distension of the container. The pleating or accordion shape of the body is so constructed that it tends to assume an expanded state as seen in FIG. 6. In order to collapse the container it must be forcibly pressed down to the level of the particulate or fluid within the container. Thus the volumetric dimension of the container approximates the volume of the material within the container. As the material is depleted through the ingress-egress opening 10' of the neck portion of the container is progressively collapsed. Inasmuch as the material composing the container is biased to expand from the inherit nature of the material from which it is constructed, it will tend to do so which prevents the contents from spilling out of the container, if the container tended to collapse. In this embodiment described in FIG. 6, the neck 5' is threaded at 11' and receives a closure cap 12' threaded thereon. The cap 12' has a top 13' which is designed to engage with the upper edge of the neck 5' to effect a seal thereat.

Figure 5:
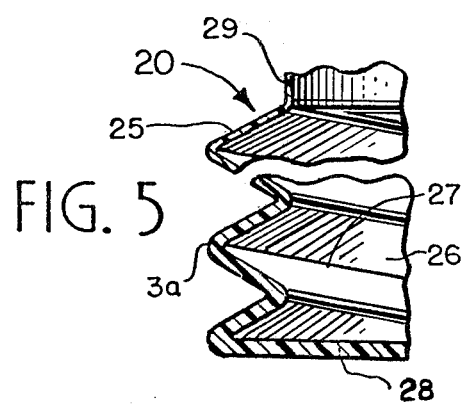
FIG. 5 is a fragmentary axial section view of a modification of the container shown in FIG. 1.

Attention now is directed toward FIG. 6 and more particularly toward that portion of FIG. 6 through which a plane designated X—X transverses a corrugation through the apex 8' of the corrugation. It can be seen that the top segment 7' of each corrugation is related to the hypothetical plane X—X by an angle $\beta$ and the bottom segment of each corrugation is related to that same plane by an angle designated $\phi$. It is understood that the angles $\beta$ and $\phi$ are of different dimensions and that the angle $\beta$ is greater than the angle $\phi$ by a few degrees. The actual values of the angles will be dependant upon the lengths of the segments and the width of the corrugation. It also can be seen that the segments of any particular corrugation become progressively thicker from the top of the container as it approaches the bottom thereof and that the corrugations in this particular embodiment are parallel to one another as contrasted to the embodiment described in FIG. 5.

This embodiment also shows a gas impermeable envelope designated L which is contained within the container and has a body portion 9a which is introduced into the container through 10'opening 1'. The envelope has a neck portion 10a which fits complimentary within the opening 10' and is connected as at 11a to the upper edge of the neck portion 5' by any suitable adhesive such as well known to those skilled in the art. The envelope L is comprised of a material, such as aluminum foil, which upon introduction to the container can be expanded by means, such as air, to form and conform to the internal convolutions and shape of the container in the expanded position. It is also contemplated that adhesive could be sprayed into the container before the insertion and expansion of the envelope wherein this would promote adherence of the entire envelope to the internal shape of the container. With such a liner L disposed within the container it can be appreciated that permeation of gas is minimized and, therefore, any food stuffs which would be stored therein would not be exposed to the seepage of such gas through the side walls of the container itself. It can also be appreciated that such a liner by preventing a gas permeation through the walls of the container will assure that upon collapsing the container at some position that a partial vacuum therein will be maintained. It should be understood that although a metal liner is disclosed it is contemplated that the reduction of gas permeability can be accomplished within the scope of the invention by forming a laminate from plurality of layers of thermoplastic material, one of the layers being formed from a thermoplastic resin which would exhibit high gas barrier properties such as polyvinylidene chloride, and acrylonitrile polymers. Reference is made to U.S. Pat. Nos. 3,453,173, 3,464,546, and 3,615,308 which teach such methods. Also it is contemplated that such resins such as nylon or saran which have high gas barrier properties (U.S. Pat. No. 3,093,255 and U.S. Pat. No. 3,373,224) may be used.

DESCRIPTION OF FIG. 11

Structure of the container 20' in this embodiment is the same as that described in FIGS. 6 through 10 which may be formed of polyethylene or polypropalene or like materials. It can be seen, however, the liner L in this particular embodiment is disposed on the outside of the container. In this embodiment the body 3' comprises corrugations 25' which have sections 26' merging into an apical formation 27'. It can also be seen that this embodiment incorporates the features previously described in the aforementioned embodiment in that the corrugations in the segments thereof become progressively thicker from the top to the bottom of the container. It can also be seen that the body 3' comprises a neck 29' which is shown of smaller diameter than that of the body portion but which, of course, could be the same or even larger if desired.

It is contemplated that if the envelope L is a metalized foil, the container 3' may be inserted into said envelope and then the envelope evacuated in order to cause it to collapse against the external side walls and surfaces of the container and thereby conform to the configuration of the container itself. If necessary, adhesive could be applied to the external surfaces of the container before evacuation of the envelope is effected in order to bond the envelope through the external walls and surfaces of the container. This could be accomplished in many ways as well known to those skilled in the art. However, if a plastic gas barrier media is used, such as heretofor described in connection with the previous embodiment, such material may be applied either by spraying or by coextrusion during the injection molding proceedures forming the container.

It can be appreciated that the embodiments heretofor described show containers which are so constructed to collapse from the top in a progressive manner toward the bottom of the container. This feature follows down through the full depth of the container thus accomplishing an evacuation of air from the top to the bottom of the container, and also providing a method by which the container may be selectively reduced in volumetric dimension to the level of unused product or condiment contained therein. In other words, as a product is withdrawn from the top of the container, that portion being more flexible than the portions below, it can be collapsed as seen in FIG. 9 and the cap screwed on. The interior volume of air above the level of the product is thus reduced to the minimum, which retards spoilage.

This sequence of container compression is extremely important, because considering the broad application of this type of container and the various types of products to be preserved in a partial vacuum, it is best not to disturb the contents in the area of the container below the level of usage.

For example, it is best not to disturb certain jellies or preserves below the level of usage to avoid chances of spoilage from excessive exposure to air.

Another example is when containing fragile articles such as potato chips, crackers, cookies, etc., compression of segments in increments from top to bottom will allow evacuation of air from the container to the level of the contents without wedging against and fracturing the contents in the lower portions of the container.

It will be appreciated that the embodiments of the invention heretofor described were chosen for the purpose of illustration and description and, therefore, are preferred based upon requirements for achieving the objects of the invention and developing the utility thereof in the most desirable manner, due regard being had to existing factors of economy, simplicity of design and construction, production methods and improvements saught to be effected. It will be understood, that the particular structure and functional aspect emphasized herein are not intended to exclude but rather to suggest such other modifications and adaptations as fall within the spirit and scope of the invention as defined in the appended claims:

What is claimed is:

1. A reusable plastic container comprising: a self-expanding pleated cylindrical body having an access opening at the top and a base at the bottom thereof; said body comprising a plurality of folds disposed between said top and base and having upper and lower converging portions; and each fold characterized by increased rigidity from the upper to the lower portions thereof whereby upon pressure being applied to the top of said container, said body will collapse progressively from the top to the bottom thereof.

2. A reusable plastic container comprising: a self-expanding pleated cylindrical body having an access opening at the top and a base at the bottom thereof; said body comprising a folded portion having upper and lower converging segments; said folded portion spiraled about said body in the form of a helix from the top to the base thereof; and said upper and lower segments becoming continually and progressively thicker from the top of said container toward the bottom thereof whereby said folded portion becomes increasingly rigid from the top of the container to the bottom thereof to effect a progressive collapse from the top to the bottom of said container upon pressure being applied to the top thereof.

3. The invention as recited in claim 2 wherein said upper segment is thicker than the corresponding lower segment at any particular point along the folded portion.

4. The invention as recited in claim 3 wherein said body comprises a neck portion circumferentially disposed about said access opening; and closure means releasably connectable to said neck portion operative to seal the container thereat.

5. The invention as recited in claim 4 and said fold being foldable axially of the container, said body being held in collapsed condition by vacuum developed in the container attendant to expansion of the container to a state of equilibrium upon said closure means sealing the access opening of the container.

6. The invention as recited in claim 3 wherein said body defines internal and external surfaces; means disposed in nestling relationship on at least one of said surfaces effective to prohibit the permeation of gas through the walls of said container.

7. The invention as recited in claim 6 body in claim 6 body is constructed of polyethylene.

8. A resuable plastic container comprising; a pleated cylindrical body having an access opening at the top and a base at the bottom thereof; said body comprising a plurality of pleats successively connected from the top of said container to the base thereof, and each pleat having upper and lower converging portions; and each upper portion of a particular pleat being more flexible than the corresponding lower portion, and each pleat having less flexibility than one thereabove whereby said pleats progressively collapse from top to bottom of said container upon a load being applied to the top thereof.

9. The invention as recited in claim 8 wherein said pleats from the top to the bottom of the container being of progressively increasing thickness.

10. The invention as recited in claim 9 wherein the upper portion of any particular pleat is thicker than the corresponding lower portion of that pleat.

11. The invention as recited in claim 10 wherein the upper and lower portions of any particular pleat join in an outwardly directed apex and adjacent portions of respective pleats merging into bights and an angle between the upper portion of any particular pleat and hypothetical plane passing through the apex of that pleat is greater than an angle between the corresponding lower portion and that same plane.

12. The invention as recited in claim 11 wherein said body comprises a neck portion circumferentially disposed about said access opening, and closure means releasably connectable to said neck portion operative to seal the container thereat.

13. The invention as recited in claim 12 wherein said pleats being foldable axially of the container, said body being held in collapsed condition by vacuum developed in the container attendant to expansion of the container to a state of equilibrium upon said closure means sealing the access opening of the container.

14. The invention as recited in claim 13 wherein said body defines internal and external surfaces, means disposed about at least one of said surfaces effective to prohibit the permeation of gas through the walls of the container.

15. The invention as recited in claim 14 wherein said means comprises an envelope having high gas barrier properties, and said envelope disposed in nestling relationship on at least one of said surfaces.

16. The invention as recited in claim 15 wherein the surface on which said envelope is disposed is treated with an adhesive to promote conformation of said envelope to the pleats and shape of the container.

17. The invention as recited in claim 12 wherein said container is constructed of polyethylene.

* * * * *